United States Patent
Nakaya et al.

(10) Patent No.: US 10,610,993 B2
(45) Date of Patent: Apr. 7, 2020

(54) MACHINE TOOL CONTROL DEVICE AND MACHINE TOOL EQUIPPED WITH SAID CONTROL DEVICE

(71) Applicants: Citizen Watch Co., Ltd., Tokyo (JP); Citizen Machinery Co., Ltd., Nagano (JP)

(72) Inventors: Takaichi Nakaya, Nagano (JP); Kazuhiko Sannomiya, Nagano (JP); Ayako Kitakaze, Tokyo (JP)

(73) Assignees: Citizen Watch Co., Ltd., Tokyo (JP); Citizen Machinery Co. Ltd., Nagano (JP)

( * ) Notice: Subject to any disclaimer, the term of this patent is extended or adjusted under 35 U.S.C. 154(b) by 0 days.

(21) Appl. No.: 15/761,474

(22) PCT Filed: Sep. 13, 2016

(86) PCT No.: PCT/JP2016/076898
§ 371 (c)(1),
(2) Date: Mar. 20, 2018

(87) PCT Pub. No.: WO2017/051745
PCT Pub. Date: Mar. 30, 2017

(65) Prior Publication Data
US 2018/0257192 A1    Sep. 13, 2018

(30) Foreign Application Priority Data
Sep. 24, 2015    (JP) ................. 2015-187081

(51) Int. Cl.
*B23B 29/12* (2006.01)
*B23Q 15/013* (2006.01)
(Continued)

(52) U.S. Cl.
CPC .............. *B23Q 15/013* (2013.01); *B23B 1/00* (2013.01); *B23B 29/125* (2013.01);
(Continued)

(58) Field of Classification Search
CPC ........... B23B 29/125; B23G 3/00; B24B 1/04; Y10T 82/20; Y10S 82/904
See application file for complete search history.

(56) References Cited

U.S. PATENT DOCUMENTS 3,174,404 A * 3/1965 Findley ................ B23B 1/00
                                                                       82/11.1
4,496,321 A * 1/1985 Kumabe ............ B23Q 11/0039
                                                                       433/119
(Continued)

FOREIGN PATENT DOCUMENTS

JP    2001-150201 A    6/2001
JP    2002-144101 A    5/2002
(Continued)

OTHER PUBLICATIONS

Altintas, Y, et al: "Virtual Design and Optimization of Machine Tool Spindles", CIRP Annals, vol. 54, No. 1, Jun. 25, 2007 (Jun. 25, 2007), pp. 379-382, XP029790550, ISSN: 0007-8506, DOI: 101.016/S0007-8506(7)60127-9.

*Primary Examiner* — Alan Snyder
(74) *Attorney, Agent, or Firm* — Howson & Howson LLP

(57) ABSTRACT

A control apparatus for machine tool, in accordance with user set conditions, feeds a cutting tool in a feeding direction while reciprocatively vibrating the cutting tool, smoothly cuts a workpiece, and achieves a machined surface having an improved appearance. In a machine tool and a control apparatus thereof, a control means is configured to set the number of rotations of relative rotation and the number of vibrations of reciprocating vibration during one rotation of the relative rotation in accordance with a vibration frequency attributable to a cycle during which an operation instruction can be issued, and the control means includes adjusting means configured to adjust the number of rotations or the number of vibrations set by the control means.

7 Claims, 7 Drawing Sheets

(51) Int. Cl.
*B23B 1/00* (2006.01)
*G05B 19/4093* (2006.01)
*G05B 19/402* (2006.01)

(52) U.S. Cl.
CPC ....... *G05B 19/402* (2013.01); *G05B 19/4093* (2013.01); *G05B 2219/36204* (2013.01); *G05B 2219/37077* (2013.01); *G05B 2219/49382* (2013.01)

(56) References Cited

U.S. PATENT DOCUMENTS

| | | | | |
|---|---|---|---|---|
| 4,640,156 | A | * | 2/1987 | Nakagawa ............... B23B 25/02 144/42 |
| 4,911,044 | A | * | 3/1990 | Mishiro ................ B23B 29/125 82/158 |
| 6,349,600 | B1 | * | 2/2002 | Davies ............... B23Q 17/0976 73/104 |
| 2006/0099039 | A1 | * | 5/2006 | Maki .................... B23B 29/125 408/1 R |
| 2007/0052326 | A1 | * | 3/2007 | Liu ....................... B23B 29/125 310/323.18 |
| 2009/0107308 | A1 | | 4/2009 | Woody et al. |
| 2014/0102268 | A1 | | 4/2014 | Hariki et al. |
| 2014/0216216 | A1 | * | 8/2014 | Hessenkamper ..... B23B 29/125 82/1.11 |
| 2018/0036807 | A1 | * | 2/2018 | Ketelaer ............... B23B 29/125 |

FOREIGN PATENT DOCUMENTS

| | | |
|---|---|---|
| JP | 2014-54688 A | 3/2014 |
| WO | 03-086688 A1 | 10/2003 |
| WO | 3124174 A1 | 2/2017 |

* cited by examiner

FIG.5

| INSTRUCTION CYCLE (s) | VIBRATION FREQUENCY f (Hz) |
|---|---|
| 0.004 × 4 | 62.5 |
| 0.004 × 5 | 50 |
| 0.004 × 6 | 41.666 |
| 0.004 × 7 | 35.714 |
| 0.004 × 8 | 31.25 |
| ... | ... |

FIG.7

TABLE OF NUMBER OF ROTATIONS S (r/min) OF SPINDLE CORRESPONDING TO VALUE OF NUMBER OF VIBRATIONS N AND VALUE OF VIBRATION FREQUENCY f

| | | VIBRATION FREQUENCY f (Hz) | | | |
|---|---|---|---|---|---|
| | | 62.5 | 50 | 41.666 | ... |
| NUMBER OF VIBRATIONS N DURING ROTATION OF SPINDLE | 3.5 | 1071.429 | 857.1429 | 714.2743 | ... |
| | 2.5 | 1500 | 1200 | 999.984 | ... |
| | 1.5 | 2500 | 2000 | 1666.64 | ... |
| | 0.5 | 7500 | 6000 | 4999.92 | ... | ical value attributable to a cycle
MACHINE TOOL CONTROL DEVICE AND MACHINE TOOL EQUIPPED WITH SAID CONTROL DEVICE

FIELD OF THE INVENTION

The present invention relates to a control apparatus of a machine tool that machines a workpiece while sequentially separating chips generated during cutting, and also relates to a machine tool including the control apparatus.

BACKGROUND OF THE INVENTION

A conventionally known machine tool includes a cutting tool configured to cut a workpiece, rotating means configured to rotate the cutting tool and the workpiece relative to each other, feeding means configured to feed the cutting tool and the workpiece in a predetermined feeding direction, and vibration means configured to allow relative reciprocating vibration between the cutting tool and the workpiece.

An example of such a machine tool is described in United States Patent Publication No. 2014/0102268, published on Apr. 17, 2014. A control apparatus of the machine tool allows the machine tool to machine the workpiece by relative rotation between the cutting tool and the workpiece and by feed movement of the cutting tool toward the workpiece with reciprocating vibration.

The conventional machine tool is configured so that an operation instruction is issued by the control apparatus at a predetermined cycle. Therefore, the vibration frequency at which the cutting tool and the workpiece vibrate relative to each other is defined as a limited value attributable to a cycle during which the operation instruction can be issued by the control apparatus. However, the above vibration frequency is not considered in the conventional machine tool. Therefore, with respect to any number of rotations of the relative rotation, the reciprocating vibration may not be performed at any number of vibrations of the cutting tool relative to the workpiece during one rotation of the workpiece. Further, stripe patterns are generated on a machining surface of the workpiece when the cutting work is performed by reciprocatively vibrating the cutting tool, which may cause deterioration of the appearance of the machining surface of the workpiece.

SUMMARY OF THE INVENTION

The present invention is intended to solve the above problems of the prior art. That is, it is an object of the present invention to provide a control apparatus of a machine tool and a machine tool including the control apparatus, wherein the machine tool is configured to feed a cutting tool in a feeding direction while reciprocatively vibrating the cutting tool, and to smoothly cut the workpiece, and the machine tool can improve the appearance of the machining surface of the workpiece.

According to a first aspect of the present invention, the above problems are solved by a control apparatus of a machine tool, the control apparatus being provided in the machine tool that includes: a cutting tool configured to cut a workpiece; rotating means configured to rotate the cutting tool and the workpiece relative to each other; feeding means configured to feed the cutting tool and the workpiece in a predetermined feeding direction; and vibration means configured to allow relative reciprocating vibration between the cutting tool and the workpiece, the control apparatus comprising control means configured to allow the machine tool to machine the workpiece by relative rotation between the cutting tool and the workpiece and by feed movement of the cutting tool toward the workpiece with reciprocating vibration thereof, wherein the control means is configured to set the number of rotations of the relative rotation and the number of vibrations of the reciprocating vibration during one rotation of the relative rotation in accordance with a vibration frequency attributable to a cycle during which an operation instruction can be issued, and the control means includes adjusting means configured to adjust the number of rotations or the number of vibrations, which is set by the control means.

According to a second aspect of the present invention, in addition to the configuration of the control apparatus of the machine tool described in the first aspect, the vibration means is configured to reciprocatively vibrate the cutting tool and the workpiece relative to each other in the feeding direction. Thus, the foregoing problems are further solved.

In the control apparatus of the machine tool according to a third aspect of the present invention, in addition to the configuration of the control apparatus of the machine tool described in the first or second aspect, the vibration means is configured to reciprocatively vibrate the cutting tool and the workpiece relative to each other such that a cut portion during a forward movement overlaps with a cut portion during a backward movement. Thus, the foregoing problems are further solved.

In the control apparatus of the machine tool according to a fourth aspect of the present invention, in addition to the configuration of the control apparatus of the machine tool described in any one of the first to third aspects, the control means includes: setting means configured to set a value of at least one of parameters to the control apparatus, the parameters being the number of rotations of the relative rotation, the number of vibrations of the reciprocating vibration, and the vibration frequency; and correction means configured to set an unset value of the parameters to a predetermined value and to correct, on the basis of the set predetermined value, the value of the parameter that is set by the setting means, wherein the adjusting means is configured to adjust the number of rotations of the relative rotation or the number of vibrations, which has been corrected by the correction means. Thus, the foregoing problems are further solved.

In the control apparatus of the machine tool according to a fifth aspect of the present invention, in addition to the configuration of the control apparatus of the machine tool described in the fourth aspect, an adjustment value for adjusting the number of rotations of the relative rotation or the number of vibrations is set by the setting means, and the adjusting means is configured to perform the adjustment on the basis of the adjustment value. Thus, the foregoing problems are solved.

In the control apparatus of the machine tool according to a sixth aspect of the present invention, in addition to the configuration of the control apparatus of the machine tool described in the fourth or fifth aspect, the correction means is configured to set the unset value of the parameters to the predetermined value so that the number of rotations and the number of vibrations are inversely related to each other in which a constant is based on the vibration frequency, and to correct the value of the parameter that is set by the setting means. Thus, the foregoing problems are further solved.

In the control apparatus of the machine tool according to a seventh aspect of the present invention, in addition to the configuration of the control apparatus of the machine tool described in any one of the fourth to sixth aspects, the number of rotations is set as the parameter set by the setting means, and the correction means is configured to set the number of vibrations to a plurality of pre-set predetermined values, set the vibration frequency to a predetermined value specifically included in the control apparatus, and correct the value of the number of rotations set by the setting means, on the basis of each of the predetermined values of the number of vibrations and the set vibration frequency. Thus, the foregoing problems are further solved.

In the control apparatus of the machine tool according to an eighth aspect of the present invention, in addition to the configuration of the control apparatus of the machine tool described in any one of the fourth to sixth aspects, the number of rotations and the number of vibrations are set as the parameters set by the setting means, and the correction means is configured to correct the set number of rotations and the set number of vibrations to respective values of the number of rotations and the number of vibrations, which are set on the basis of the vibration frequency. Thus, the foregoing problems are further solved.

In the control apparatus of the machine tool according to a ninth aspect of the present invention, the machine tool includes the control apparatus described in any one of the first to eighth aspects. Thus, the foregoing problems are solved.

According to the control apparatus of the machine tool of the present invention, the control means sets the conditions on the number of rotations and the number of vibrations in accordance with the vibration frequency; thereby, the workpiece can be smoothly cut. In addition, the number of rotations or the number of vibrations set by the control means can be adjusted, for example, by a user with the adjusting means. Therefore, within a range adjustable by the adjusting means, the number of rotations or the number of vibrations is adjusted and thereby the appearance of the workpiece can be improved.

Also, according to the machine tool of the present invention, the workpiece can be smoothly cut by the control apparatus of the machine tool.

BRIEF DESCRIPTION OF THE DRAWINGS

FIG. 5 is a chart showing the relationship between the instruction cycle and the vibration frequency according to the embodiment of the present invention.

FIG. 7 is a table of the number of rotations corresponding to the number of vibrations and the vibration frequency, which is shown as a variation of correction made by correction means according to the embodiment of the present invention.

DETAILED DESCRIPTION

A control apparatus of a machine tool according to an aspect of the present invention may be embodied in any manner as long as the control apparatus is provided in the machine tool that includes: a cutting tool configured to cut a workpiece; rotating means configured to rotate the cutting tool and the workpiece relative to each other; feeding means configured to feed the cutting tool and the workpiece in a predetermined feeding direction; and vibration means configured to allow relative reciprocating vibration between the cutting tool and the workpiece, the control apparatus including control means configured to allow the machine tool to machine the workpiece by relative rotation between the cutting tool and the workpiece and by feed movement of the cutting tool toward the workpiece with reciprocating vibration thereof, and as long as the control means is configured to set the number of rotations of the relative rotation and the number of vibrations of the reciprocating vibration during one rotation of the relative rotation in accordance with a vibration frequency attributable to a cycle during which an operation instruction can be issued, the control means including adjusting means configured to adjust the number of rotations or the number of vibrations, which is set by the control means, whereby the cutting tool is fed in the feeding direction while reciprocatively vibrating and the workpiece is smoothly cut, and in addition, the appearance of a machining surface of the workpiece is improved.

Figure 1:
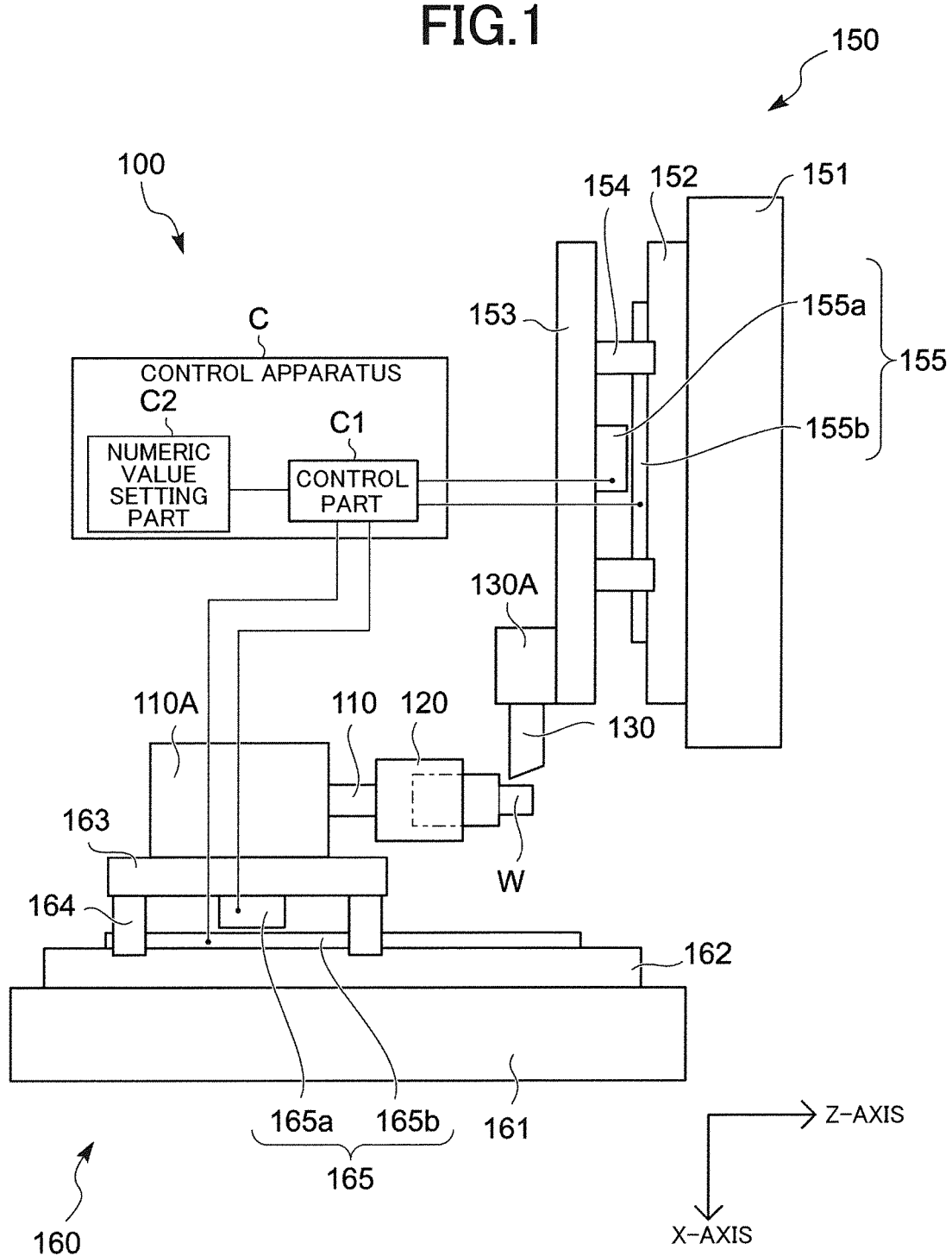
FIG. 1 is a schematic view showing a machine tool according to an embodiment of the present invention.

FIG. 1 is a schematic view showing a machine tool 100 including a control apparatus C according to an embodiment of the present invention. The machine tool 100 includes a spindle 110 and a cutting tool rest 130A. The spindle 110 is configured as workpiece holding means to hold a workpiece W via the chuck 120. The spindle 110 is supported by a spindle stock 110A so as to be rotatably driven by power from a spindle motor (not shown). A conventionally known built-in motor or the like formed between the spindle stock 110A and the spindle 110 may be used as the spindle motor in the spindle stock 110A.

The spindle stock 110A is mounted on a bed side of the machine tool 100 so as to be movable in a Z-axis direction, which is an axis direction of the spindle 110, by a Z-axis direction feeding mechanism 160. The spindle 110 is configured to be moved via the spindle stock 110A in the Z-axis direction by the Z-axis direction feeding mechanism 160. The Z-axis direction feeding mechanism 160 configures a spindle moving mechanism configured to move the spindle 110 in the Z-axis direction.

The Z-axis direction feeding mechanism 160 includes: a base 161 integral with a fixed side of the Z-axis direction feeding mechanism 160, such as the bed; and a Z-axis direction guide rail 162 provided on the base 161 and extending in the Z-axis direction. A Z-axis direction feeding table 163 is slidably supported by the Z-axis direction guide rail 162 via Z-axis direction guides 164. A mover 165a of a linear servo motor 165 is provided on the side of the Z-axis direction feeding table 163, and a stator 165b of the linear servo motor 165 is provided close to the base 161.

The spindle stock 110A is mounted on the Z-axis direction feeding table 163, and the Z-axis direction feeding table 163 is configured to be movably driven in the Z-axis direction by the linear servo motor 165. The spindle stock 110A is moved in the Z-axis direction according to the movement of the Z-axis direction feeding table 163, thereby moving the spindle 110 in the Z-axis direction.

A cutting tool 130, such as a tool bit, configured to cut the workpiece W is attached to the cutting tool rest 130A; therefore, the cutting tool rest 130A configures a tool rest that holds the cutting tool 130. An X-axis direction feeding mechanism 150 is provided on the bed side of the machine tool 100.

The X-axis direction feeding mechanism 150 includes: a base 151 integral with the bed side; and an X-axis direction guide rail 152 extending in an X-axis direction, which is orthogonal to the Z-axis direction in an up and down direction. The X-axis direction guide rail 152 is fixed to the base 151, and an X-axis direction feeding table 153 is slidably supported by the X-axis direction guide rail 152 via X-axis direction guides 154. The cutting tool rest 130A is mounted on the X-axis direction feeding table 153.

A linear servo motor 155 includes a mover 155a and a stator 155b. The mover 155a is provided on the X-axis direction feeding table 153, and the stator 155b is provided close to the base 151. When the X-axis direction feeding table 153 is driven by the linear servo motor 155 to move along the X-axis direction guide rail 152 in the X-axis direction, the cutting tool rest 130A moves in the X-axis direction and thus the cutting tool 130 moves in the X-axis direction. Additionally, a Y-axis direction feeding mechanism may be provided. A Y-axis direction is a direction orthogonal to the shown Z-axis and X-axis directions. The Y-axis direction feeding mechanism may be configured in the same way as the X-axis direction feeding mechanism 150.

The X-axis direction feeding mechanism 150 is mounted on the bed via the Y-axis direction feeding mechanism; whereby, a Y-axis direction feeding table is driven by a linear servo motor to be moved in the Y-axis direction and thus the cutting tool rest 130A can be moved in the Y-axis direction as well as the X-axis direction. Consequently, the cutting tool 130 can be moved in the X-axis direction and the Y-axis direction.

The Y-axis direction feeding mechanism may be mounted on the bed via the X-axis direction feeding mechanism 150 and the cutting table rest 130A may be mounted on the Y-axis direction feeding table.

A tool rest moving mechanism (the X-axis direction feeding mechanism 150 and the Y-axis direction feeding mechanism) and the spindle moving mechanism (the Z-axis direction feeding mechanism 160) operate cooperatively. Accordingly, the cutting tool rest 130A is moved in the X-axis direction by the X-axis direction feeding mechanism 150 and in the Y-axis direction by the Y-axis direction feeding mechanism, and the spindle stock 110A (spindle 110) is moved in the Z-axis direction by the Z-axis direction feeding mechanism 160. Therefore, the cutting tool 130 attached to the cutting tool rest 130A is fed toward the workpiece W in any feeding direction. The rotation of the spindle 110 and the movement of the X-axis direction feeding mechanism 150, the Z-axis direction feeding mechanism 160, or the like are controlled by the control apparatus C.

Figure 2:
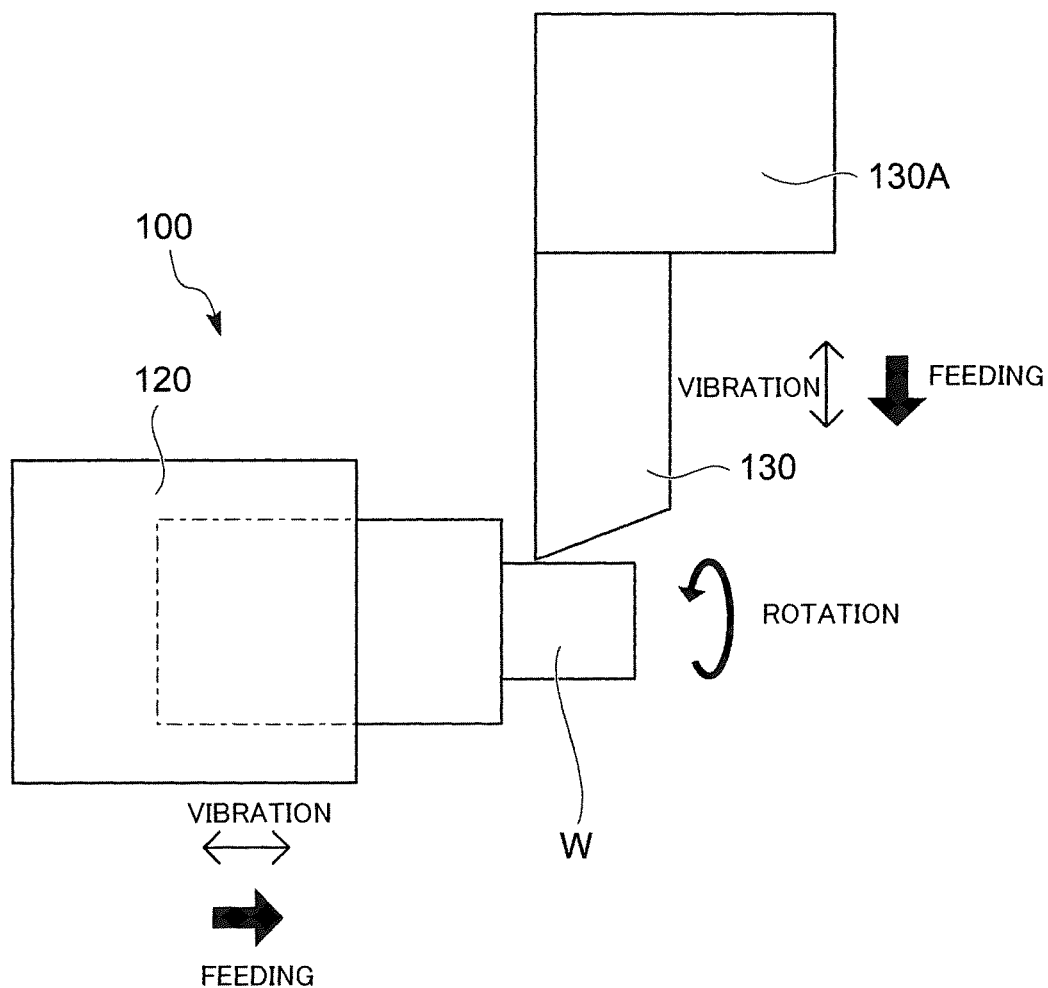
FIG. 2 is a schematic view showing the relationship between a cutting tool and a workpiece according to the embodiment of the present invention.

The spindle 110 and the cutting tool rest 130A are moved relative to each other by feeding means configured by the spindle moving mechanism (the Z-axis direction feeding mechanism 160) and the tool rest moving mechanism (the X-axis direction feeding mechanism 150 and the Y-axis direction feeding mechanism), whereby the cutting tool 130 is fed toward the workpiece W in any feeding direction. Therefore, as shown in FIG. 2, the workpiece W can be cut with the cutting tool 130 into any shape.

In the present embodiment, both the spindle stock 110A and the cutting tool rest 130A are configured to be movable. Alternatively, the spindle stock 110A may be fixed on the bed side of the machine tool 100 so as not to be movable and the tool rest moving mechanism may be configured to move the cutting tool rest 130A in the X-axis direction, the Y-axis direction, and the Z-axis direction. In this case, the feeding means is configured by the tool rest moving mechanism that is configured to move the cutting tool rest 130A in the X-axis direction, the Y-axis direction, and the Z-axis direction, and the feeding means moves the cutting tool rest 130A toward the spindle 110 that is fixedly positioned so as to be rotatably driven. Therefore, the cutting tool 130 can be fed in the feeding direction toward the workpiece W.

Also, the cutting tool rest 130A may be fixed on the bed side of the machine tool 100 so as not to be movable and the spindle moving mechanism may be configured to move the spindle stock 110A in the X-axis direction, the Y-axis direction, and the Z-axis direction. In this case, the feeding means is configured by the spindle moving mechanism that is configured to move the spindle stock 110A in the X-axis direction, the Y-axis direction, and the Z-axis direction, and the spindle stock 110A is moved toward the cutting tool rest 130A that is fixedly positioned. Therefore, the cutting tool 130 can be fed in the feeding direction toward the workpiece W.

Additionally, in the present embodiment, the X-axis direction feeding mechanism 150, the Y-axis direction feeding mechanism, and the Z-axis direction feeding mechanism 160 are each configured to be driven by the linear servo motor but may be driven, for example, by a conventionally known ball screw and a conventionally known servo motor.

Further, in the present embodiment, rotating means for rotating the workpiece W and the cutting tool 130 relative to each other is configured by the spindle motor such as the built-in motor. The spindle 110 is rotatably driven, whereby the workpiece W and the cutting tool 130 are rotated relative to each other. In the present embodiment, the workpiece W is rotatable relative to the cutting tool 130.

Alternatively, the cutting tool 130 may be rotatable relative to the workpiece W. In this case, a rotating tool such as a drill may be applied as the cutting tool 130. A control part C1 included in the control apparatus C serves as control means. The rotation of the spindle 110 and driving of the Z-axis direction feeding mechanism 160, the X-axis direction feeding mechanism 150, and the Y-axis direction feeding mechanism are controlled to be driven. The control part C1 is set in advance so that the feeding mechanisms as vibration means are controlled to move the spindle stock 110A or the cutting tool rest 130A in respective moving directions while reciprocatively vibrating the spindle stock 110A or the cutting tool rest 130A in the respective moving directions.

Figure 3:
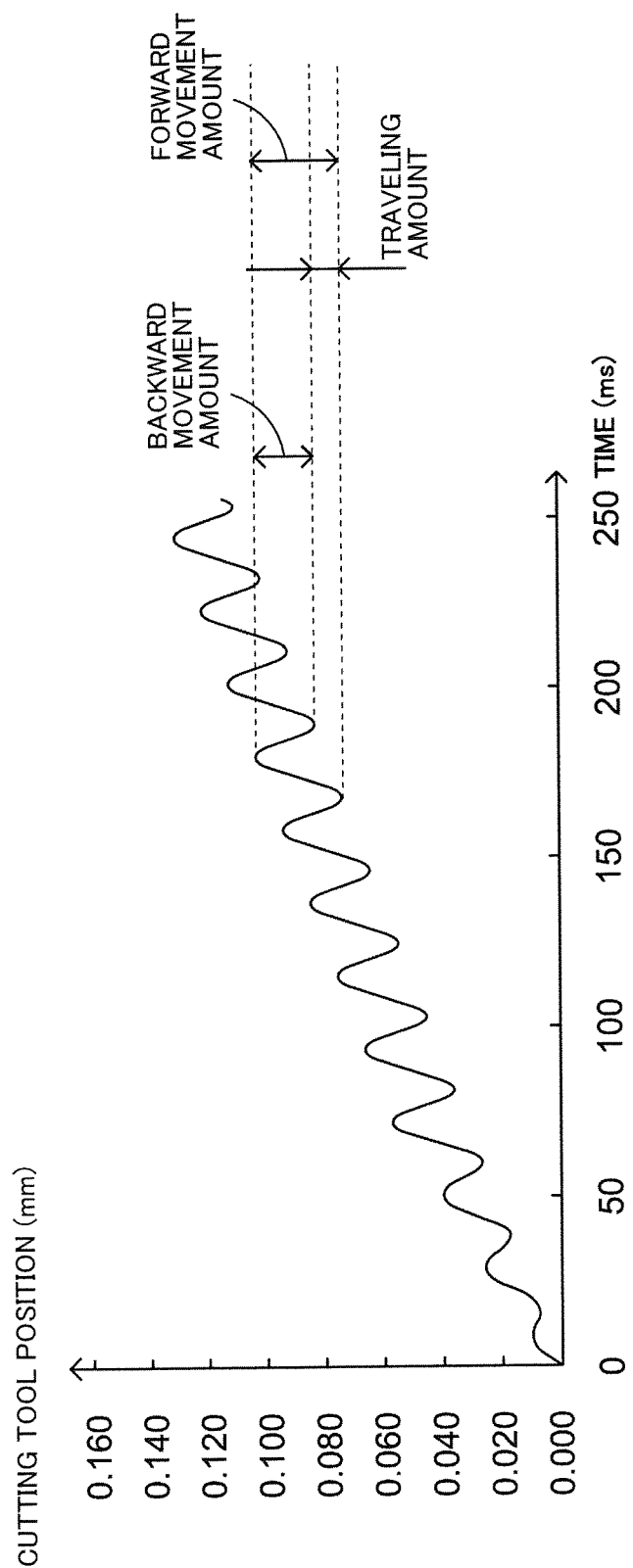
FIG. 3 is a graph showing the reciprocating vibration and a position of the cutting tool according to the embodiment of the present invention.

Each of the feeding mechanisms is controlled by the control part C1 to, in each reciprocating vibration, move the spindle 110 or the cutting tool rest 130A forward by a predetermined forward movement amount (forward movement) and subsequently move the spindle 110 or the cutting tool rest 130A backward by a predetermined backward movement amount (backward movement); therefore, the spindle 110 or the cutting tool rest 130A is moved in each moving direction by a traveling amount that is a difference between the predetermined forward movement amount and the predetermined backward movement amount, as shown in FIG. 3. As a result, the feeding mechanisms cooperatively operate to feed the cutting tool 130 toward the workpiece W in the feeding direction.

Figure 4:
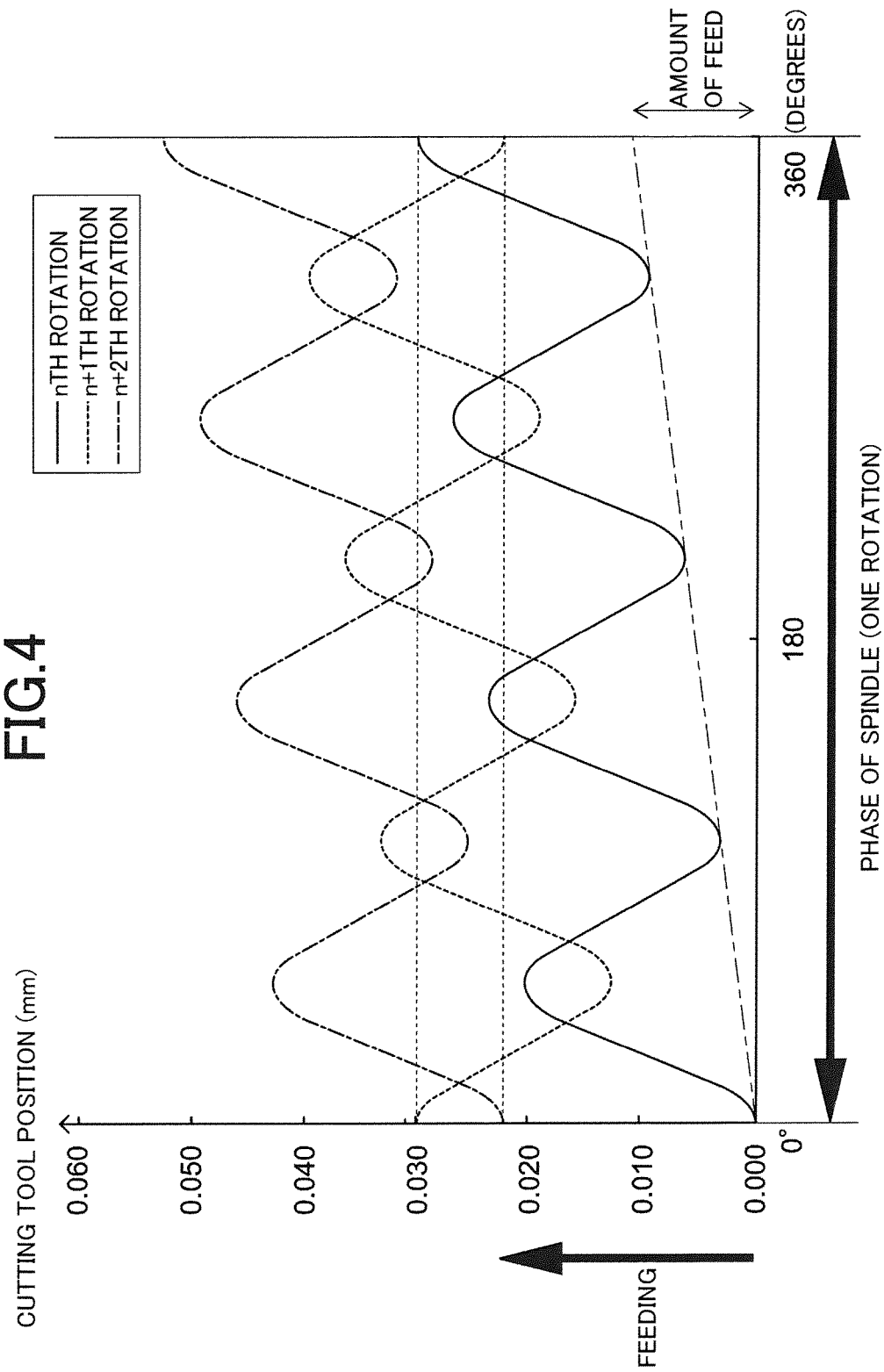
FIG. 4 is a graph showing the relationship among the nth rotation, the n+1th rotation, and the n+2th rotation of a spindle according to the embodiment of the present invention.

As shown in FIG. 4, the machine tool 100 allows the Z-axis direction feeding mechanism 160, the X-axis direction feeding mechanism 150, and the Y-axis direction feeding mechanism to feed the cutting tool 130 while reciprocatively vibrating the cutting tool 130 in the feeding direction by the amount of feed which is a total of the traveling amount during one rotation of the spindle, i.e., when the phase of the spindle has changed from 0 degrees to 360 degrees, thereby machining the workpiece W.

The spindle stock 110A (spindle 110) or the cutting tool rest 130A (cutting tool 130) moves while reciprocatively vibrating in a state where the workpiece W is rotating; therefore, the outline of the workpiece W is cut into the predetermined shape with the cutting tool 130. In such a case, a circumferential surface of the workpiece W is cut with the cutting tool 130 into a sine-curve shape. On an imaginary line (an alternate long and short dash line) passing the bottom of a waveform of the sine-curve shape, the amount of change in position when the phase of the spindle has changed from 0 degrees to 360 degrees indicates the amount of feed. As shown in FIG. 4, a case where the number of vibrations N of the spindle stock 110A (spindle 110) or the cutting tool rest 130A during one rotation of the workpiece W is 3.5 (the number of vibrations N=3.5) will be described as an example.

In this case, the phase of the shape of the circumferential surface of the workpiece W cut with the cutting tool 130 during the n+1th rotation of the spindle 110 (n is an integer equal to or larger than 1) is shifted from the phase of the shape of the circumferential surface of the workpiece W cut with the cutting tool 130 during the nth rotation of spindle 110 in a spindle phase direction (a horizontal axis on the graph). Therefore, the position of a lowest point at the bottom of the phase (the position of a peak point at the top on a dotted waveform graph, such as a cut point of the workpiece W cut furthest in the feeding direction with the cutting tool 130) during the n+1th rotation is shifted from the position of a lowest point at the bottom of the phase (the position of a peak point at the top on a solid waveform graph) during the nth rotation in the spindle phase direction.

Thus, a cut portion in the forward movement of the cutting tool 130 partially overlaps with a cut portion in the backward movement of the cutting tool 130, which means that a portion of the circumferential surface of the workpiece W, which is cut during the n+1th rotation includes a portion of the circumferential surface of the workpiece W, which has been cut during the nth rotation. In such an overlapped portion, the cutting tool 130 does not cut the workpiece W at all, that is, the cutting tool 130 performs an "air cut." Chips generated from the workpiece W during the cutting work are sequentially separated by the air cut. Thus, the machine tool 100 can smoothly machine the outline of the workpiece W while separating chips via the reciprocating vibration of the cutting tool 130 in a cut-feeding direction.

In order to sequentially separate chips via the reciprocating vibration of the cutting tool 130, it is only necessary that a portion of the circumferential surface of the workpiece W, which is cut during the n+1th rotation includes a portion of the circumferential surface of the workpiece W, which has been cut during the nth rotation. In other words, a path traced by the cutting tool 130 on the circumferential surface of the workpiece W in the backward movement during the n+1th rotation of the workpiece W simply needs to reach a path traced by the cutting tool 130 on the circumferential surface of the workpiece W during the nth rotation. The phase of the shape of the circumferential surface of the workpiece W cut with the cutting tool 130 during the n+1th rotation simply needs to be non-coincident with (not the same as) the phase of the shape of the circumferential surface of the workpiece W cut with the cutting tool 130 during the nth rotation, and does not need to be a 180-degree inversion of the phase of the shape of the circumferential surface of the workpiece W cut with the cutting tool 130 during the nth rotation. For example, the number of vibrations N may be 1.1, 1.25, 2.6, 3.75, or the like.

Alternatively, the number of vibrations N may be set so that the number of vibrations generated during one rotation of the workpiece W is smaller than 1 (0<the number of vibrations N<1.0). In this case, the spindle 110 rotates one rotation or more for each vibration. Also, the number of vibrations N can be set as the number of rotations of the spindle 110 for each vibration.

In the machine tool 100, an operation instruction is issued by the control part C1 at a predetermined instruction cycle. The reciprocating vibration of the spindle stock 110A (spindle 110) or the cutting tool rest 130A (cutting tool 130) can be performed at a predetermined frequency based on the instruction cycle. For example, if the machine tool 100 is configured such that 250 instructions per second can be issued by the control part C1, the operation instruction is issued by the control part C1 at a cycle of 4 ms (equivalent to 1/250), which is a reference cycle.

The instruction cycle is defined based on the reference cycle and is generally the integral multiple of the reference cycle. The reciprocating vibration can be performed at a frequency according to a value of the instruction cycle. As shown in FIG. 5, for example, when 16 ms which is the quadruple of the reference cycle of 4 ms is defined as the instruction cycle, the forward and backward movements are performed every 16 ms. Thus, the spindle stock 110A (spindle 110) or the cutting tool rest 130A (cutting tool 130) can reciprocatively vibrate at a frequency of 62.5 Hz equivalent to 1/(0.004×4).

Alternatively, the spindle stock 110A (spindle 110) or the cutting tool rest 130A (cutting tool 130) can reciprocatively vibrate only at plural predetermined discrete frequencies of 50 Hz equivalent to 1/(0.004×5), 41.666 Hz substantially equivalent to 1/(0.004×6), 35.714 Hz substantially equivalent to 1/(0.004×7), 31.25 Hz equivalent to 1/(0.004×8), and the like.

The frequency f (Hz) as a vibration frequency at which the spindle stock 110A (spindle 110) or the cutting tool rest 130A (cutting tool 130) reciprocatively vibrates is defined as a value selected from the frequencies described above. Also, the control apparatus C (control part C1) can set the instruction cycle by multiplying the reference cycle (4 ms) by any multiple number other than integral numbers. In this case, a frequency according to such an instruction cycle can be applied as the vibration frequency.

When the number of rotations S of the spindle 110 is defined as S (r/min) in the case of reciprocating vibration of the spindle stock 110A (spindle 110) or the cutting tool rest 130A (cutting tool 130), the number of vibrations N is defined as N=f×60/S.

Figure 6:
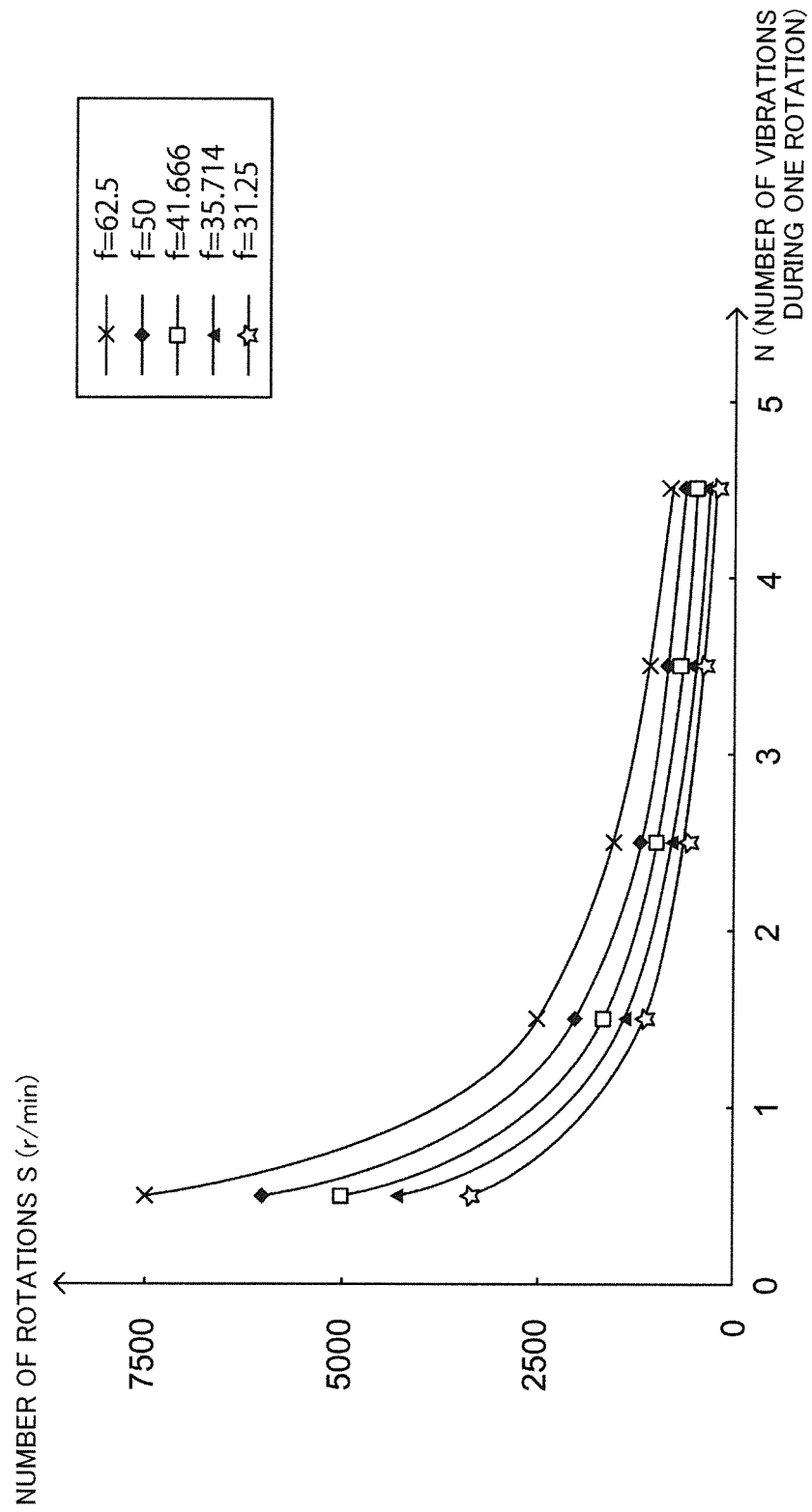
FIG. 6 is a graph showing the relationship among the number of vibrations, the number of rotations, and the vibration frequency.

As shown in FIG. 6, in which each curve represents a different constant vibration frequency f, the number of rotations S and the number of vibrations N are inversely related to each other. The spindle 110 can rotate at higher speed when the vibration frequency f has a higher value or when the number of vibrations N has a smaller value.

In the machine tool 100 according to the present embodiment, the vibration frequency f includes plural predetermined discrete frequencies, and the number of rotations S, the number of vibrations N, and the vibration frequency f are set as parameters. A user can set the number of rotations S and the number of vibrations N of these three parameters via a numeral value setting part C2 or the like to the control part 11. In order to set the number of rotations S or the number of vibrations N to the control part C1, a value of the number of rotations S or the number of vibrations N can be input as a parameter value into the control part C1. Also, for example, a value of the number of rotations S or the number of vibrations N may be written in a machining program. Alternatively, the number of vibrations N may be set as an argument in a program block (on one line in the program).

When setting means is configured such that the number of vibrations N can be particularly set as an argument in the program block of the machining program, the user can easily set the number of rotations S and the number of vibrations N from the machining program with the number of rotations S of the spindle 110, which is generally written on the machining program and the number of vibrations N, which is written as the argument in the program block. Also, setting by the setting means may be performed through a program or may be performed by the user via the numeral value setting part C2.

Also, a circumferential speed and a workpiece diameter can be set and inputted via the machining program or the like, and the number of rotations S can be calculated and set on the basis of the circumferential speed and the workpiece diameter. The setting means is configured to calculate the number of rotations S on the basis of the circumferential speed and the workpiece diameter that are set and inputted via the machining program or the like; thereby, the user can unintentionally and easily set the number of rotations S according to the circumferential speed that is defined based on the material of the workpiece W or on the type, shape, material, or the like of the cutting tool 130.

The control part C1 controls, on the basis of the set number of rotations S and the set number of vibrations N, the spindle stock 110A or the cutting tool rest 130A to move while reciprocatively vibrating so that the spindle 110 is rotated at the set number of rotations S and so that the cutting tool 130 is fed in the feeding direction while reciprocatively vibrating at the set number of vibrations N in the feeding direction.

Also, the number of rotations S and the number of vibrations N are defined based on the vibration frequency f as described above; therefore, the control part C1 includes correction means configured to correct the set number of rotations S and the set number of vibrations N on the basis of the vibration frequency f. The correction means sets the vibration frequency f on the basis of N=60f/S so that the vibration frequency f has a value near a value calculated from the set number of vibrations N and the set number of rotations S, and the correction means can correct the number of vibrations N and the number of rotations S with the set vibration frequency f to values near their respective set values.

For example, the number of rotations and the number of vibrations are respectively set by the user at S=3000 (r/min) and N=1.5. In this case, a value of the vibration frequency of 75 Hz is derived from S=3000 (r/min) and N=1.5. Therefore, the correction means sets the vibration frequency f, for example, at 62.5 Hz. Thus, the correction means may correct the number of vibrations N to 1.25 on the basis of the set vibration frequency f (62.5 Hz) while, for example, maintaining the number of rotations S (3000 r/min). Alternatively, the correction means may correct the number of rotations S to 2500 r/min on the basis of the set vibration frequency f (62.5 Hz) while, for example, maintaining the number of vibrations N (1.5). Also, the vibration frequency f is set at 50 Hz and thereby the number of rotations S and the number of vibrations N can be corrected to 2400 r/min and 1.25, respectively.

Under the condition based on the number of vibrations N and the number of rotations S, which are set by the setting means, via the correction of the number of rotations S and the number of vibrations N by the correction means, the machine tool 100 is configured so as to allow the Z-axis direction feeding mechanism 160, the X-axis direction feeding mechanism 150, and the Y-axis direction feeding mechanism to feed the cutting tool 130 in the feeding direction while reciprocatively vibrating the cutting tool 130 in the feeding direction and so as to smoothly cut the workpiece W while separating chips. In some cases, for example, the life-span of the cutting tool 130 can be extended. Thus, the workpiece W can be machined under the condition relatively close to the number of rotations S and the number of vibrations N intended by the user.

In any of such cases, in accordance with machining conditions, one of the number of rotations S and the number of vibrations N is corrected in priority to the other of the number of rotations S and the number of vibrations N or both the number of rotations S and the number of vibrations N are corrected; thereby, the correcting conditions can be changed. Alternatively, the user sets in advance the vibration frequency f used by the setting means and then the number of vibrations N or the number of rotations S can be corrected in accordance with the set vibration frequency f.

In this case, in a state where the control part C1 is in a stable control mode, the cutting tool 130 is fed in the feeding direction while being reciprocatively vibrated in the feeding direction and can smoothly and stably cut the outline of the workpiece W while separating chips.

Also, in order to reduce the machining cycle time, the spindle 110 is desirably set so as to rotate at high speed as much as possible. In order to rotate the spindle 110 at high speed, it is necessary to set the vibration frequency f high as much as possible. However, it is not easy in terms of stable control or the like to set the vibration frequency f higher than necessary. Accordingly, the number of vibrations N is set low as much as possible, whereby the number of rotations S can be set high as much as possible.

In this case, the setting means is configured to set the number of vibrations N as the number of rotations of the spindle 110 for each vibration; thereby, the setting of easily increasing the number of rotations S can be performed. The number of rotations of the spindle 110 for each vibration is set to 1 or more and the number of vibrations N is set to a value larger than 0 and smaller than 1, whereby the spindle 110 can rotate at high speed. It is noted that since the length of each chip to be separated is relatively long, the number of vibrations N needs to be set so as not to adversely affect the cutting work.

In the present embodiment, of the three parameters, the number of vibrations N or the number of rotations S is set via the numeral value setting part C2 or the like to the control part C1. Alternatively, for example, the number of vibrations N is fixed in advance at a predetermined value so as to avoid the necessity of inputting, and only the number of rotations S is set by the user as one of the three parameters. Then, the vibration frequency f is set according to the fixed number of vibrations N and the set number of rotations S; thereby, the number of vibrations N or the number of rotations S may be corrected in accordance with the set vibration frequency f.

Also, if only the number of rotations S is set by the user as one of the three parameters, the control part C1 may be configured to, with respect to the set number of rotations S, calculate the number of vibrations, which corresponds to each vibration frequency, per vibration frequency and to set the number of vibrations N at which chips are separated via the reciprocating vibration of the cutting tool 130, without correcting the set number of rotations S. In this case, with respect to the number of rotations S set by the user, the control part C1 performs the reciprocating vibration of the cutting tool 130 at the vibration frequency f, which is the number of vibrations N set by the control part C1. However, if it is difficult that the number of vibrations N at which chips are separated as described above is set according to the user set number of rotations S or the user set operable vibration frequency, the control part C1 may be configured to adjustably set the amplitude of the reciprocating vibration at a value that allows chips to be separated.

Also, the correction means of the control part C1 may be configured to correct the set number of rotations S on the basis of the vibration frequency f. As shown in FIG. 7, the control part C1 includes a table of the number of rotations S11, S12, S13 . . . , S21 . . . , S31 . . . of the spindle 110, which correspond to the number of vibrations N1, N2, N3 . . . of reciprocating vibration during one rotation of the spindle and the vibration frequency f1, f2, f3 . . . attributable to a cycle during which the operation instruction can be issued, and thereby the correction means may correct the user set number of rotations S to any of values of the number of rotations S, which are included in the table.

As described above, the cutting tool 130 is fed in the feeding direction while being reciprocatively vibrated in the feeding direction and thereby cuts the outline of the workpiece W while separating chips. In such a case, a portion of the circumferential surface of the workpiece W, which is cut during the n+1th rotation includes a portion of the circumferential surface of the workpiece W, which has been cut during the nth rotation, which means that a cut portion during the forward movement during the reciprocating vibration overlaps with a cut portion during the backward movement during the reciprocating vibration. Therefore, stripe patterns are formed on a machining surface of the workpiece, i.e., the circumferential surface of the workpiece machined by vibration cutting. Consequently, the exterior, i.e., the appearance of the machining surface of the workpiece may be adversely affected. Thus, in the present embodiment, the control part C1 includes adjusting means configured to adjust the number of rotations S of the spindle 110 after the correction by the correction means. The adjusting means in the present embodiment is configured to adjust the number of rotations S of the spindle 110 according to an adjustment value, which is set in advance to the control part C1, without changing the vibration frequency f defined by the correction by the correction means. In order to set the adjustment value to the control part C1, the adjustment value can be input as a parameter value into the control part C1 in the same way as the foregoing setting of the number of rotations S, the number of vibrations N, and the vibration frequency f. Also, for example, the adjustment value can be written in the machining program. Alternatively, the adjustment value can be set as an argument in the program block. When the setting means is configured so that particularly the adjustment value can be set as the argument in the program block of the machining program in the same way as the number of vibrations N, the user can easily set the number of rotations S, the number of vibrations N, and the adjustment value from the machining program with the number of rotations S of the spindle 110, which is generally written on the machining program and with the number of vibrations N and the adjustment value, which are written as the arguments in the program block. Also, setting by the setting means may be performed through a program or may be performed by the user via the numeral value setting part C2.

For example, the control part C1 is configured to instruct by a command $G_{\Delta\Delta\Delta}$ PO in the machining program to start vibration cutting in which the cutting tool 130 is fed in the feeding direction while reciprocatively vibrating relative to the workpiece W in the feeding direction. In such a case, a value of the number of vibrations N, which is to be set to the control part C1 can be set as a value D (argument D) following the command $G_{\Delta\Delta\Delta}$ PO. Further, an amplitude feed ratio to be set to the control part C1 (the amplitude feed ratio is a ratio between the amount of feed and the amplitude of reciprocating vibration generated by the vibration means and is a value obtained by dividing the amplitude by the amount of feed) can be set as a value Q (argument Q). Furthermore, the adjustment value can be set as a value J (argument J).

If the adjustment value is 0.77, J0.77 is commanded. Accordingly, the adjustment value is added to the number of rotations S of the spindle 110 (for example, 2400 r/min, a value corrected as described above) without changing the vibration frequency f after the correction by the correction means (when the adjustment value is a negative value, the adjustment value is subtracted from the number of rotations S of the spindle 110). Thus, the number of rotations S can be adjusted, for example, from 2400 r/min to 2400.77 r/min. In addition, the number of rotations S may be adjusted by the adjusting means after the correction by the correction means. Also, the correction by the correction means may include the correction of only the number of vibrations N by the correction means, the correction of only the number of rotations S by the correction means, and the correction of both the number of vibrations N and the number of rotations S by the correction means. The adjustment may be any amount as long as it is smaller than the amount of correction made by the correction means, and the absolute value of the adjustment value is not necessarily less than 1.

The number of rotations S is adjusted from 2400 r/min to 2400.77 r/m. Accordingly, the relation of N=60f/S is maintained when the vibration frequency f is 50 Hz as described above. Therefore, the number of vibrations N is also adjusted from 1.25 to 1.249559. In the present embodiment, the adjusting means is configured to adjust the number of rotations S after the correction by the correction means. Alternatively, the adjusting means may be configured to adjust the number of vibrations N after correction by the correction means. In this case, an adjustment value for adjusting the number of vibrations N is set by the setting means, and then this adjustment value is passed as an argument to the adjusting means.

As described above, the adjustment value is set as the value J (argument J), whereby the number of rotations S of the spindle 110 is adjusted. Accordingly, stripe patterns are inhibited from being remarkably generated on the machining surface of the workpiece; therefore, the appearance of the machining surface of the workpiece can be improved.

In the embodiment as above, a case where the spindle or the cutting tool rest moves forward by the predetermined forward movement amount (forward movement) and then moves backward by the predetermined backward amount (backward movement) is described as the reciprocating vibration in the moving direction by the vibration means. Alternatively, the reciprocating vibration can be performed by repeating the forward movement as a relative movement at a predetermined first speed and a stop at zero speed in the feeding direction, in place of the backward movement, as a relative movement at a second speed slower than the first speed.

Also, in place of the backward movement as the relative movement at the second speed, a movement at a speed slower than the first speed in the same direction as the forward movement at the first speed in the feeding direction, and the forward movement may be repeated. In any of the above cases, chips are easily separated to break in a location where the width of the chips generated from the workpiece W is small.

The invention claimed is:

1. A control apparatus of a machine tool, the control apparatus being provided in a machine tool that includes:
   a cutting tool configured to cut a workpiece;
   rotating means configured to rotate the cutting tool and the workpiece relative to each other;
   feeding means configured to feed the cutting tool and the workpiece in a predetermined feeding direction; and
   vibration means configured to cause relative reciprocating vibration between the cutting tool and the workpiece in the feeding direction such that a cut portion during a forward movement overlaps with a cut portion during a backward movement;
   the control apparatus comprising control means configured to cause the machine tool to machine the workpiece by relative rotation between the cutting tool and the workpiece and by feed movement of the cutting tool toward the workpiece with reciprocating vibration thereof;
   wherein the control means is configured to set the number of rotations of the relative rotation and the number of vibrations of the reciprocating vibration during one rotation of the relative rotation in a relation where the number of rotations and the number of vibrations are inversely related to each other with a constant being a vibration frequency at which the reciprocating vibration can be performed based on a cycle during which an operation instruction by which the feeding means are controlled to be driven can be issued; and
   wherein the control means includes adjusting means configured to adjust the number of rotations and the number of vibrations set by the control means while maintaining the vibration frequency within a range where overlapping of the cut portion during the forward movement with the cut portion during the backward movement is maintained.

2. The control apparatus of the machine tool according to claim 1, wherein the control means includes:
   setting means configured to set a value of at least one of a group of parameters to the control means, said parameters being the number of rotations of the relative rotation, the number of vibrations of the reciprocating vibration, and the vibration frequency; and
   correction means configured to set an unset value of said parameters to a predetermined value and to correct, on the basis of the set predetermined value, the value of the parameter that is set by the setting means; and
   wherein the adjusting means is configured to adjust the number of rotations of the relative rotation which has been corrected by the correction means, or the number of vibrations which has been corrected by the correction means.

3. The control apparatus of the machine tool according to claim 2, wherein an adjustment value for adjusting the number of rotations of the relative rotation or the number of vibrations is set by the setting means, and the adjusting means is configured to perform the adjustment on the basis of the adjustment value.

4. The control apparatus of the machine tool according to claim 2, wherein the correction means is configured to set the unset value of the parameters to the predetermined value so that the number of rotations and the number of vibrations are inversely related to each other by a constant based on the vibration frequency, and to correct the value of the parameter that is set by the setting means.

5. The control apparatus of the machine tool according to claim 2, wherein the number of rotations is set as the parameter by the setting means, and the correction means is configured to set the number of vibrations to a plurality of pre-set predetermined values, to set the vibration frequency to a predetermined value specifically included in the control apparatus, and to correct the value of the number of rotations set by the setting means, on the basis of each of the predetermined values of the number of vibrations and the set vibration frequency.

6. The control apparatus of the machine tool according to claim 2, wherein the number of rotations and the number of vibrations are set as the parameters by the setting means, and the correction means is configured to correct the set number of rotations and the set number of vibrations to respective values of the number of rotations and the number of vibrations, which are set on the basis of the vibration frequency.

7. A machine tool comprising the control apparatus according to claim 1.

* * * * *